(12) United States Patent
Mahlanen

(10) Patent No.: US 7,225,762 B2
(45) Date of Patent: Jun. 5, 2007

(54) SPRAYING METHOD AND APPARATUS

(75) Inventor: Timo Mahlanen, Helsinki (FI)

(73) Assignee: Marioff Corporation Oy, Vantaa (FI)

( * ) Notice: Subject to any disclaimer, the term of this patent is extended or adjusted under 35 U.S.C. 154(b) by 0 days.

(21) Appl. No.: 10/511,943

(22) PCT Filed: Apr. 16, 2003

(86) PCT No.: PCT/FI03/00306

§ 371 (c)(1),
(2), (4) Date: May 26, 2005

(87) PCT Pub. No.: WO03/089780

PCT Pub. Date: Oct. 30, 2003

(65) Prior Publication Data

US 2005/0252461 A1   Nov. 17, 2005

(30) Foreign Application Priority Data

Apr. 19, 2002 (FI) .................. 20020757

(51) Int. Cl.
F02M 25/28 (2006.01)
(52) U.S. Cl. .................. 123/25 B
(58) Field of Classification Search ............. 123/25 B, 123/527, 542
See application file for complete search history.

(56) References Cited

U.S. PATENT DOCUMENTS

| | | | | |
|---|---|---|---|---|
| 4,509,464 A | * | 4/1985 | Hansen | 123/1 A |
| 4,519,341 A | * | 5/1985 | McGarr | 123/1 A |
| 4,628,871 A | * | 12/1986 | Glass | 123/25 B |
| 5,121,713 A | * | 6/1992 | Peterson | 123/25 B |
| 5,257,598 A | * | 11/1993 | Mehr | 123/25 B |
| 5,758,606 A | | 6/1998 | Rosen et al. | |
| 7,051,720 B2 | * | 5/2006 | Gottemoller et al. | 123/563 |
| 2005/0257754 A1 | * | 11/2005 | Jenkins et al. | 123/25 B |

FOREIGN PATENT DOCUMENTS

| | | |
|---|---|---|
| DE | 19750181 A1 | 5/1999 |
| EP | 1076168 A2 | 2/2001 |
| EP | 1076169 A2 | 2/2001 |
| EP | 1205659 A2 | 5/2002 |
| WO | 9523286 | 8/1995 |

* cited by examiner

Primary Examiner—Stephen K. Cronin
Assistant Examiner—Jason Benton
(74) Attorney, Agent, or Firm—Ladas and Parry LLP

(57) ABSTRACT

A method for spraying an aqueous liquid into the air intake duct (2) of a turbocharged piston engine (1) for humidifying the intake air to reduce nitrogen oxide emissions. In a first stage in the method, the intake air is heated by a heat exchanger element (5') before the turbocharger and water mist is injected into the air intake duct after the first heading stage through at lea one first nozzle (9, 10), and in a second stage the intake air is compressed by the turbocharger (4), causing its temperature to rise, and water mist is injected into the air intake duct through at least one second nozzle (12, 13) after the second stage.

10 Claims, 1 Drawing Sheet

SPRAYING METHOD AND APPARATUS

BACKGROUND OF THE INVENTION

The present invention relates to a method as defined in the preamble of claim 1 for spraying an aqueous liquid into the air intake duct of a turbocharged piston engine for humidifying the intake air to reduce nitrogen oxide emissions.

The invention also relates to a spraying apparatus as defined in claim 3 for humidifying the intake air of a turbocharged piston engine to reduce nitrogen oxide emissions, said apparatus comprising at least one nozzle for spraying an aqueous liquid into the air intake duct.

The invention thus concerns especially a method and apparatus for supplying water into the intake air of a turbocharged piston engine to reduce nitrogen oxide emissions (NOx). At the high combustion temperatures, the combustion process in the cylinder of a piston engine produces nitrogen oxides, which are emitted together with the exhaust gases into the atmosphere. Because of the harmful climatic effects of nitrogen oxide emissions, efforts are undertaken to minimize their production.

As is known, adding water to the combustion process in the form of either water vapor or water droplets reduces the generation of nitrogen oxides. This phenomenon is based on a cooling effect. When the water sprayed into the cylinder is evaporated, it reduces the temperature of the air in the cylinder while at the same time reducing the pressure. The pressure drop has an adverse effect on the efficiency, although the decrease of pressure and temperature has a favorable effect on the formation of nitrogen oxides. When the water is supplied in the form of droplets together with the intake air, some of it is additionally wasted during the scavenging period and water consumption is increased. When air saturated with water vapor is supplied into the cylinder, the thermal capacity of the filling gas is increased and the gas has a substantially greater effect of reducing the temperatures of the combustion process than does dry air. The effect of reducing the combustion temperatures increases with the water vapor concentration, yet without producing an undesirable effect on efficiency. Since an increase in the temperature of the gas supplied into the cylinder also augments the generation of nitrogen oxides as well as the consumption of water, it is desirable to keep the gas temperature as low as possible, yet high enough to ensure that the gas supplied into the cylinder contains an amount of water vapor sufficient for the reduction of nitrogen oxides.

An apparatus for vaporizing a desired amount of water is disclosed in patents U.S. Pat. No. 5,758,606 and U.S. Pat. No. 6,196,165. A drawback with this apparatus is that the device mounted between the turbocharger and the cylinder increases the cubic volume of the air intake ductwork, which has a considerable effect on the power output of the engine. The power output is dependent on the cubic volume after the turbocharger because during power increase or decrease the air pressure produced by the turbocharger increases the density of the air and the amount of gas entering the cylinder. If the cubic volume between the turbocharger and the cylinder is increased, it will take considerably longer before the amount of air produced by the turbocharger brings the pressure to the desired level and the power generated by the engine increases. Another drawback with the apparatus is that the heated water used for vaporization and flushed over the evaporation surfaces has the effect of increasing the temperature of the air. The device is unable to make use of the cooling effect produced in connection with the vaporization of the water, but the gas output from the device is at a relatively high temperature, so the amount of water vapor required for the reduction of nitrogen oxides and therefore also the water consumption are increased considerably.

Specification WO98/10185 again discloses an apparatus in which the air produced by a turbocharger and the pressure of this air are utilized in the injection of water for humidifying the air supplied to the turbocharger. A drawback with this system is the relatively low temperature of the supply air, which is why the amount of water vapor evaporated into the air remains small, and thus no significant nitrogen oxide reducing effect is achieved. Another drawback is that when the amount of water is increased, the water droplets can evaporate after the air has reached a saturated state, with the result that the water droplets drift into the turbocharger and cause wear of the turbocharger vanes through droplet erosion. From a thermodynamical viewpoint, the drifting of droplets into the turbocharger is desirable as it reduces the work performed by the turbocharger, increasing the pressure of the pressurized air produced at the output and simultaneously reducing its temperature. In practice, however, a turbocharger rotating at a very high speed—about 50,000–100,000 rpm—has proved to be very sensitive to droplet erosion as referred to above.

The object of the present invention is to achieve a spraying system for supplying water mist into the air intake ductwork of especially a piston engine and allowing the drawbacks of prior-art to be avoided. An additional object of the invention is to achieve a method and apparatus that will enable efficient humidification of intake air.

The method of the invention is mainly characterized in that, in a first stage in the method, the intake air is heated by a heat exchanger element before the turbocharger and water mist is injected into the air intake duct after the first heating stage through at least one first nozzle, that in a second stage the intake air is compressed by the turbocharger, causing its temperature to rise, and water mist is injected into the air intake duct through at least one second nozzle after the second stage.

The apparatus of the invention is mainly characterized in that the apparatus comprises at least one heating element for heating the intake air before the turbocharger and at least one first nozzle for injecting an aqueous liquid mist into the air intake duct after the heating element.

The apparatus of the invention is further characterized by what is stated in claims 4–10.

The solution of the invention has numerous significant advantages. The apparatus is connected directly to the structures of the air intake duct and it produces a fine mist directly without using any extra chambers or other containers, it is able to make full use of the heat quantity required for the vaporization of the water, cooling the intake air at each spray injection point to a temperature close to the wet bulb temperature (or adiabatic saturation temperature, which in the case of a water-air mixture is practically the same thing), i.e. to the temperature to which the air temperature can be reduced by vaporization of water. As connecting the apparatus of the invention to a turbocharged engine does not involve any changes in the cubic volume of the air intake system, it has no adverse effect on the power output of the engine, either.

By the method of the invention, very good and efficient humidification of intake air is achieved. The heating of intake air used in the method can be implemented using a relatively economic construction as it does not have to withstand the high pressure after the turbocharger. The efficiency of the turbocharger is increased because the mass flow passing through it is larger than before. In addition, the engine's response time for power boost is accelerated because the turbocharger duct volume is reduced.

Another advantage of the apparatus of the invention is that the humidity of the intake air can be increased stepwise after each heat supply point, yet before the last heat supply point, which can be used as a water evaporation surface, thus controlling the humidity of the gas fed into the cylinder and therefore the formation of nitrogen oxides within desired limits.

BRIEF DESCRIPTION OF THE DRAWINGS

In the following, the invention will be described in detail by the aid of an example with reference to the attached drawing, wherein.

DETAILED DESCRIPTION OF THE INVENTION

Figure 1:
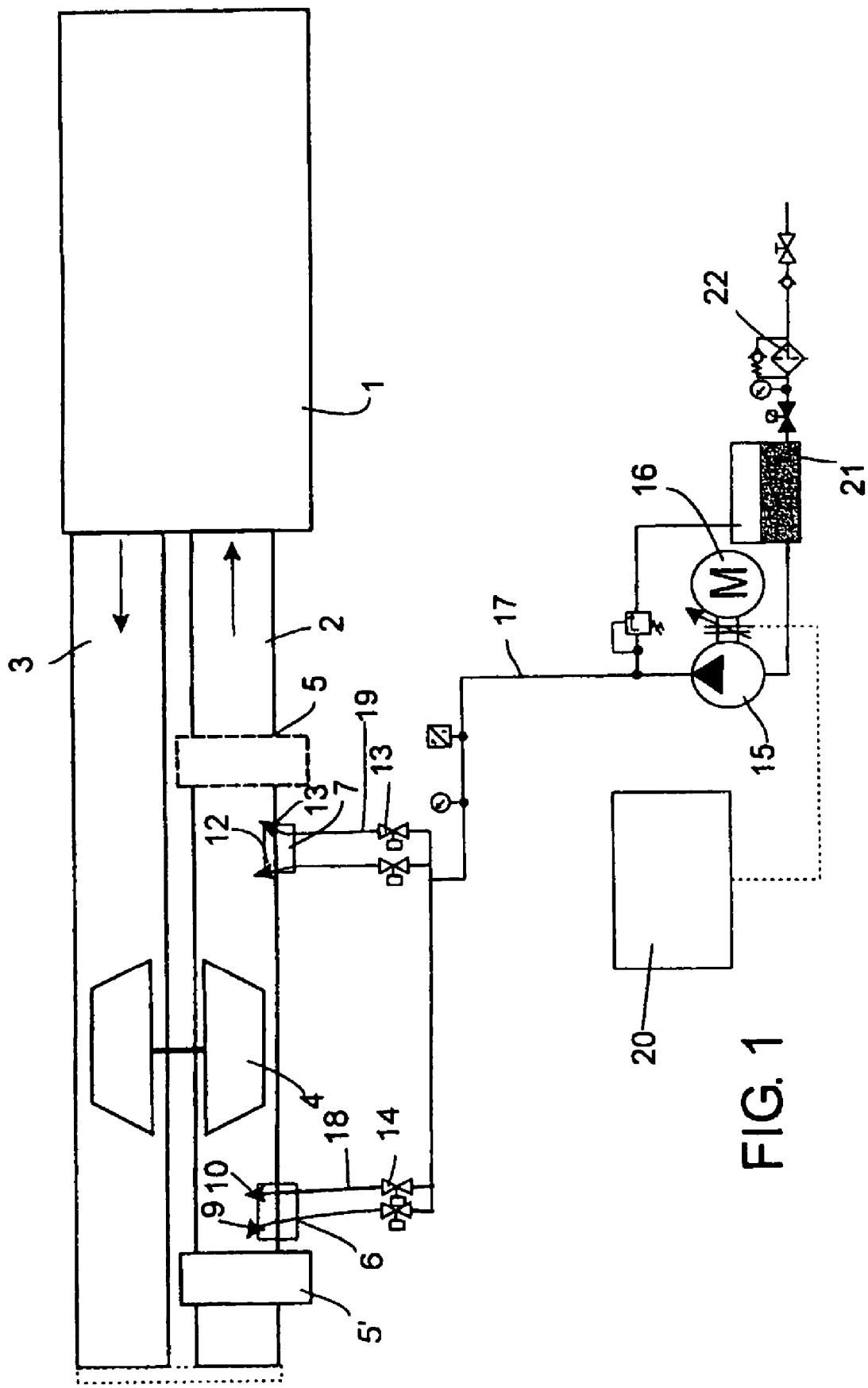
FIG. 1 presents diagram representing an apparatus according to the invention.

FIG. 1 is a diagrammatic representation of a apparatus according to the invention, installed in connection with the air intake duct 2 of a piston engine, such as a diesel engine. The air intake duct 2 and the exhaust gas duct 3 are shown in a simplified form in the FIGURE. The engine presented in the FIGURE is provided with a turbocharger 4, which feeds air under positive pressure into the air intake ductwork 2 of the engine. To reduce the nitrogen oxide emissions of the engine, the air intake ductwork is provided with at least one spraying head 6, 7 fitted to supply water mist into the intake ductwork 2. Turbocharged engines are traditionally provided with a charge-air intercooler 5, which in the FIGURE is depicted in broken lines.

According to the invention, the intake air is heated by means of a heat exchanger element 5', such as an intake air intercooler relocated to the appropriate position and converted to function as a heater as well, e.g. by providing it with equipment for engine HT-water circulation. After the first heating stage, aqueous liquid mist is sprayed into the intake air, causing the intake air temperature to fall due to the evaporation cooling of the aqueous liquid and the intake air mass flow to increase. In the next stage, an intake air compressor, such as a turbocharger 4, compresses the air, thereby raising its temperature. In a second stage after the compressor, aqueous liquid mist is injected into the intake air, with the result that the intake air temperature falls and at the same time the best evaporation result in respect of the overall outcome is achieved.

Method of the invention for spraying an aqueous liquid into the air intake duct 2 of a turbocharged piston engine 1 for humidifying the intake air to reduce nitrogen oxide emissions. In the method, the intake air is heated in a first stage before the turbocharger by a heat exchanger element 5' and water mist is injected into the air intake duct after the first heating stage through at least one first nozzle 9, 10, and in a second stage the intake air is compressed by the intake air compressor 4, causing its temperature to rise, and water mist is injected into the air intake duct through at least one second nozzle 12, 13 after the second stage. The amount of water supplied through the nozzles is adjusted according to the load and/or rotational speed of the engine.

Spraying apparatus for humidifying the intake air of a turbocharged piston engine 1 to reduce nitrogen oxide emissions, said apparatus comprising at least one nozzle for spraying an aqueous liquid into the air intake duct 2. The apparatus comprises at least one heating element 5' for heating the intake air before the turbocharger 4 and at least one first nozzle 9, 10 for injecting an aqueous liquid mist into the air intake duct after the heating element 5'. The apparatus comprises at least one second nozzle 12, 13 for injecting aqueous liquid mist into the air intake duct 2 after the compressor 4. The apparatus comprises valve elements 13, 14 used to control and/or to open/close the liquid flow passage leading to the nozzles 9–13. At least one first intake air heating element 5' is a heat exchanger element. At least one second device heating the intake air is the intake air compressor 4. The apparatus comprises control equipment by means of which the spraying action of at least some of the nozzles 9–13 can be controlled.

By the method of the invention, very good and efficient humidification of intake air is achieved. The heating of intake air used in the method can be implemented using a relatively economic construction as it does not have to withstand the high pressure after the turbocharger. The efficiency of the turbocharger is increased because the mass flow passing through it is larger than before. In addition, the engine's response time for power boost is accelerated because the turbocharger duct volume is reduced.

At least one nozzle of the spraying apparatus is connected directly to the structures of the air intake duct 2 and it produces a fine mist through its spraying head 6, 7 comprising at least one nozzle directly into the intake air in the air intake duct. When the solution of the invention is used, no extra chambers or other containers are need to be provided in the air intake duct. The nozzles feed a water mist into the air intake duct at a high pressure. The apparatus comprises means for producing the required amount of water to the desired pressure and to achieve a droplet size as favorable as possible. The pressure in the liquid supply piping is typically over 10 bar, preferably over 30 bar, most preferably over 50 bar. The pressure may be typically between 10–300 bar. The liquid, especially aqueous liquid injected into the air intake ductwork is a fine mist. Typically, 90% of the water volume (Dv50) is in the form of droplets typically having a droplet size below 200 micrometers, preferably below 100 micrometers and more preferably below 50 micrometers. Under high load conditions, the droplet size may be larger.

The system comprises means for supplying an aqueous liquid to the nozzles. In the embodiment presented in FIG. 1, the system comprises a liquid source 21, from where the liquid is pumped through a pipe 17 by means of a pump 15. The pump is operated by a drive 16. The pump is typically a high pressure pump, e.g. a displacement pump. The liquid can be directed via channels 18, 19 to different nozzles. It is also possible to supply different mediums to the nozzle, such as water and gas. The figure does not show the nozzles in detail, but they may be replaceable depending on the application. The nozzles are therefore of a type such that they produce a spray of fine mist when supplied with liquid under a high pressure. Many kinds of nozzles of this category are known, e.g. from fire extinguishing technology employing water mist. For example, specifications WO 92/20454 and WO 94/06567 disclose nozzles that produce a water mist at a high pressure. Naturally, other types of nozzles may also be used, e.g. specification WO 01/45799 discloses yet another nozzle.

The amount of water supplied through the nozzles typically increases with increasing engine load. Thus, when the engine load is low, it is possible to supply water only to some of the nozzles and increase the number of nozzles spraying when the load increases. Similarly, the spraying head can be provided with nozzles having different properties, such as flow rate, droplet size produced by the nozzles, etc. It is thus possible to form different combinations which can be adapted to a wide range of different applications, different engine types, different placements and conditions.

Typically, the amount of water supplied through the nozzles increases when the engine load increases. This can be implemented e.g. by using a control system whereby the speed of rotation of the pump 16 is increased by the drive device driving the pump. This increases the pressure in the supply piping 17 and, based on data provided by a pressure transmitter, liquid flow passages 18, 19 are opened for more nozzles 9–13 and/or a nozzle having a greater spraying capacity is engaged by opening a liquid flow passage for it. Similarly, when the load decreases, the liquid flow passages are closed for some of the nozzles and/or a nozzle with a lower spraying capacity is engaged. Correspondingly, an arrangement can be used such that, when the load is low, liquid is injected from nozzles producing a smaller droplet size, and when the load increases, the droplet size is increased, e.g. by opening a liquid flow passage to nozzles producing larger droplets.

The apparatus of the invention is able to make full use of the heat quantity required for the vaporization of the water, cooling the intake air at each spray injection point to a temperature close to the wet bulb temperature (or adiabatic saturation temperature, which in the case of a water-air mixture is practically the same thing), i.e. to the temperature to which the air temperature can be reduced by vaporization of water.

In the method and apparatus of the invention, the humidity of the intake air is preferably increased stepwise after each heat supply point. In the direction of the intake air flow, water mist is injected before the last heat supply point, which can advantageously be used as a water evaporation surface. By this arrangement, the humidity of the gas fed into the cylinder and therefore the formation of nitrogen oxides is regulated within the desired limits.

The apparatus comprises a system required for the control of the amount of water to be injected, by means of which the amount of water to be evaporated into the intake air and the cooling of the intake air can be controlled. The apparatus comprises valve elements 13, 14 arranged in connection with the liquid flow passages leading to the nozzles, e.g. in connection with the pipes 18, 19. The valves 13, 14 are typically controlled by a control system 20, allowing the liquid flow passages 18, 19 to be opened and closed as necessary.

It is obvious to the person skilled in the art that the invention is not limited to the embodiments described above, but that it may be varied within the scope of the claims presented below.

The invention claimed is:

1. In a method spraying an aqueous liquid into a duct (2) to a turbocharger (4) for intake air of a turbocharged piston engine (1) for humidifying the intake air, whereby to reduce nitrogen oxide emissions from the engine, the improvements wherein:
   in a first stage, the intake air is heated by a heat exchanger element (5') before the turbocharger and first of the aqueous liquid is first injected as a mist into the heated intake air through at least one first nozzle (9,10); and
   in a second stage, the first-injected intake air is compressed by the turbocharger (4), causing its temperature to rise, and second of the aqueous liquid is second injected as a mist into the compressed intake air through at least one second nozzle (12,13).

2. Method according to claim 1, characterized in that the amount of aqueous liquid supplied by the nozzles is adjusted according to the load and/or speed of rotation of the engine.

3. In spraying apparatus for humidifying intake air of a turbocharged piston engine (1) having a turbocharger, whereby to reduce nitrogen oxide emissions from the engine, the improvements comprising:
   at least one first nozzle for spraying an aqueous liquid into a duct (2) to the turbocharger for the intake air; and,
   at least one heating element (5') for heating the intake air in the duct, wherein the at least one first nozzle (9,10) is between the heating element (5') and the turbocharger.

4. Spraying apparatus according to claim 3, characterized in that the apparatus comprises at least one second nozzle (12,13) for spraying an aqueous liquid mist into the air intake duct (2) after the turbocharger (4).

5. Spraying apparatus according to claim 3, characterized in that the apparatus comprises valve elements (13,14) used to control and/or to open/close the liquid flow passage leading to the nozzles (9–13).

6. Spraying apparatus according to claim 3, characterized in that at least one first intake air heating element (5') is a heat exchanger element.

7. Spraying apparatus according to claim 3, characterized in that at least one second device heating the intake air is an intake air compressor (4).

8. Spraying apparatus according to claim 3, characterized in that the apparatus comprises control equipment by means of which the spraying action of at least some of the nozzles (9–12) can be controlled.

9. Spraying apparatus according to claim 3, characterized in that the droplet size of the liquid mist is usually below 200 micrometers.

10. Spraying apparatus according to claim 3, characterized in that the pressure in the liquid supply piping is 10–300 bar.

* * * * *